(12) United States Patent
Chambriard et al.

(10) Patent No.: US 9,493,038 B2
(45) Date of Patent: Nov. 15, 2016

(54) CROWN FOR AN AIRCRAFT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: François Chambriard, Clermont-Ferrand (FR); Gilles Roche, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 187 days.

(21) Appl. No.: 14/366,248

(22) PCT Filed: Dec. 18, 2012

(86) PCT No.: PCT/EP2012/075947
§ 371 (c)(1),
(2) Date: Jun. 17, 2014

(87) PCT Pub. No.: WO2013/092585
PCT Pub. Date: Jun. 27, 2013

(65) Prior Publication Data
US 2014/0326383 A1    Nov. 6, 2014

(30) Foreign Application Priority Data
Dec. 20, 2011   (FR) ...................................... 11 62035

(51) Int. Cl.
*B60C 11/117*  (2006.01)
*B60C 11/03*   (2006.01)

(52) U.S. Cl.
CPC .............. *B60C 11/03* (2013.01); *B60C 11/032* (2013.04); *B60C 2011/0339* (2013.04); *B60C 2200/02* (2013.04)

(58) Field of Classification Search
CPC ... B60C 2200/02; B60C 11/04; B60C 11/03; B60C 11/032; B60C 2011/0339; B60C 2011/0358; B60C 2011/0365; B60C 2011/0367; B60C 2011/0372; B60C 2011/0374; B60C 2011/0376; B60C 2011/0379; B60C 2011/0381; B60C 2011/0383; B60C 2011/0386; B60C 2011/0388; B60C 2011/039

USPC .............. 152/209.18, 209.17, 209.8, 209.13, 152/901; D12/522, 554, 589, 574–578
See application file for complete search history.

(56) References Cited

U.S. PATENT DOCUMENTS

| 2,540,045 A | 1/1951 | Crooker |
| D174,386 S * | 4/1955 | Hawkinson .............. 152/209.17 |

(Continued)

FOREIGN PATENT DOCUMENTS

| FR | 1067885 A | 6/1954 |
| FR | 1393989 A | 4/1965 |

(Continued)

OTHER PUBLICATIONS

PCT/EP2012/075947, International Search Report (ISR), Form PCT/ISA/210, dated Feb. 27, 2013, including English translation, 4 pgs.

*Primary Examiner* — Eric Hug
(74) *Attorney, Agent, or Firm* — Dickinson Wright PLLC

(57) ABSTRACT

A tire for an aeroplane and, in particular, a crown of a tire for an aeroplane, to reduce the dimensions and mass of pieces of tread in the event of accidental tire tread separation, without the use of additional devices external to the tire, which includes a tread intended to come into contact with the ground via a tread surface, and extending radially between a bottom surface and the tread surface, the tread comprising independent cavities. According to the invention, each cavity has, in the tread surface, an opening surface inscribed inside a circle, the centers (O) of the circles, circumscribed at the opening surfaces of the cavities, are distributed axially, over at least part of the axial width (l) of the tread surface, with an axial spacing ($p_y$) at least equal to 0.02 times and at most equal to 0.12 times the circumferential length of the periphery of the tire, and the centers (O) of the circles, circumscribed at the opening surfaces of the cavities, are distributed circumferentially, over at least part of the periphery of the tire, with a circumferential spacing ($p_x$) at least equal to 0.02 times and at most equal to 0.12 times the circumferential length of the periphery of the tire (1).

11 Claims, 3 Drawing Sheets

(56) References Cited

U.S. PATENT DOCUMENTS

| | | | | |
|---|---|---|---|---|
| 2,759,512 A | * | 8/1956 | Schlichtmann | B60C 9/20 152/209.17 |
| 3,111,975 A | * | 11/1963 | Sanders | B29D 30/52 152/209.5 |
| 3,494,401 A | * | 2/1970 | Bush | B60C 11/0306 152/209.18 |
| 3,532,147 A | * | 10/1970 | Gough | B60C 11/00 152/209.16 |
| 3,543,827 A | * | 12/1970 | Roberts | B60C 11/032 152/209.17 |
| 4,437,503 A | * | 3/1984 | Seitz | B60C 11/032 152/209.17 |
| 2006/0231181 A1 | * | 10/2006 | Roder | B60C 1/0016 152/154.2 |
| 2012/0247631 A1 | * | 10/2012 | Rooney | B60C 11/032 152/209.17 |

FOREIGN PATENT DOCUMENTS

| | | | |
|---|---|---|---|
| GB | 2114069 A | 8/1983 | |
| WO | WO 2012/105425 | * 8/2012 | ......... B60C 11/0302 |

\* cited by examiner

CROWN FOR AN AIRCRAFT TIRE

This application is a 371 national phase entry of PCT/EP2012/075947, filed 18 Dec. 2012, which claims benefit of FR 1162035, filed 20 Dec. 2011, the entire contents of which are incorporated herein by reference for all purposes.

BACKGROUND

1. Field

The present disclosure relates to a tire for an aeroplane and, in particular, to the crown of a tire for an aeroplane.

2. Description of Related Art

Aeroplane manufacturers are constantly concerned with passenger safety and, therefore, with reducing the risks of failure of their craft. Of the failure modes considered, the partial or complete loss of the tread of a tire with which an aircraft landing gear is equipped is a critical failure mode that occurs during aeroplane take-off or landing phases.

This failure mode occurs, in particular, when the tire runs over a blunt object that might by chance be present on the runway. Bearing in mind the harsh conditions of use of an aeroplane tire, which are characterized by a high inflation pressure, a high static loading and a high speed, when the tread of the tire runs over the blunt object, this causes damage to the tread which generally results in the cutting of the tread and then in pieces of tread of varying geometric dimensions and mass being thrown out.

The pieces of tread may then either strike the structures of the aeroplane and lead to significant structural damage, because of the mechanical energy stored up by the said pieces, the higher the mass and speed at which the pieces are thrown up, the higher this mechanical energy is, or may enter the aeroplane engines and lead to problems with the operation of the said engines, if these engines are unable to absorb the pieces of tread because they are too great in size.

Reinforcing the structures of the aeroplane in order to withstand potential impacts, particularly those of pieces of tread, has been considered. However, for the same materials, this solution entails increasing the mass of the structure, something which is penalizing as far as aeroplane performance is concerned, which is why increasingly lightweight structural materials are being used. Mechanically strengthening the structure does not, however, solve the problem of pieces being thrown into the engines.

Devices affording protection against pieces of tread being thrown up have also been considered. Document WO 2010012913 describes a protective panel, the external surface of which comprises a composite material, and mounted, via deformable components, on a support connected to the structure of the aeroplane. The deformable components, fixed to several support stiffening components and perpendicular to the external surface of the protective panel, are designed to buckle under the effect of impacts by thrown-up pieces of tire tread. Document WO 2010052447 describes a device that protects the engines of an aeroplane from thrown-up tire tread debris. This device comprises a protective bar connected in a pivoting manner to the aeroplane main landing gear, the protective bar being able to move between a first and a second position. In the first position, the protective bar extends laterally across the mounted assembly consisting of the tire and of a wheel, to intercept possible paths of tread debris.

Another family of solutions describes devices that break up the tread with a view to minimizing the size of the pieces of tread and therefore minimizing impacts with the aeroplane. Document U.S. Pat. No. 7,669,798 describes break-up means situated between the wheel and another part of the aeroplane and able to break up into several pieces the bit of tread which has become detached from the tire and is being thrown up towards the other part of the aeroplane. These break-up means, such as a grating with blades able to cut up the material of the tread, are designed to disperse the said pieces.

The aforementioned protective or break-up devices have the disadvantage of constituting additional structures, the additional masses of which are penalizing to the payload of the aeroplane.

SUMMARY

The inventors have therefore set themselves the objective of reducing the dimensions and therefore the mass of the pieces of tread in the event of accidental tire tread separation, without the use of additional devices external to the tire and therefore without penalizing the payload of the aeroplane.

This objective has been achieved, according to embodiments of the invention, by a tire for an aeroplane comprising:
 a tread intended to come into contact with the ground via a tread surface, and extending radially between a bottom surface and the tread surface,
 the tread comprising independent cavities,
 each cavity having, in the tread surface, an opening surface inscribed inside a circle,
 the centres of the circles, circumscribed at the opening surfaces of the cavities, being distributed axially, over at least part of the axial width of the tread surface, with an axial spacing at least equal to 0.02 times and at most equal to 0.12 times the circumferential length of the periphery of the tire,
 and the centres of the circles, circumscribed at the opening surfaces of the cavities, are distributed circumferentially, over at least part of the periphery of the tire, with a circumferential spacing at least equal to 0.02 times and at most equal to 0.12 times the circumferential length of the periphery of the tire.

As a tire has a geometry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane. The plane perpendicular to the axis of rotation of the tire and passing through the middle of the tread surface of the tire is referred to as the equatorial plane.

In what follows, the expressions "radially", "axially" and "circumferentially" respectively mean "in the radial direction", "in the axial direction" and "in the circumferential direction".

In general, a tire comprises a crown comprising a tread intended to come into contact with the ground via a tread surface, said crown being connected by two sidewalls to two beads intended to come into contact with a rim.

The tread is a torus-shaped volume comprised radially between a radially inner bottom surface and a radially outer tread surface: this is the wearing part of the tire.

The bottom surface is a theoretical surface delimiting the maximum permissible degree of wear: when the level of wear reaches this bottom surface, the tire is withdrawn from service.

The tread surface is intended to come into contact with the ground. By convention, the axial width of the tread surface is defined as being the axial distance between the axial limits of contact of the tread surface, when the tire in the new condition is subjected to a radial deflection equal to 32%, under the combined action of the vertical load and the inflation pressure. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure as recommended, for example, by the Tire and Rim Association or TRA.

The tread is generally not solid and comprises cavities, in order in particular to satisfy the requirements of making the tire grip the ground. Usually, the tread is made up of raised elements extending radially outwards from the bottom surface, the said raised elements being separated by voids. In the case of an aeroplane tire, the raised elements are usually circumferential ribs separated by circumferential voids referred to as circumferential grooves. In the invention, the cavities in the tread are independent cavities, which means to say cavities that are not connected to one another.

Radially on the inside of the tread is positioned the crown reinforcement which is the tire crown reinforcing structure. The crown reinforcement of an aeroplane tire generally comprises at least one crown reinforcing layer referred to as the crown layer. Each crown layer is made up of reinforcing elements coated in an elastomeric material, i.e. one based on natural or synthetic rubber, the said mutually parallel reinforcing elements making an angle of between +20° and −20° with the circumferential direction. In an aeroplane tire, the reinforcing elements of a crown layer are generally arranged circumferentially in an undulating curve.

Among the crown layers, a distinction is made between the working layers that constitute the working reinforcement, usually comprising textile reinforcing elements, and the protective layers constituting the protective reinforcement, usually comprising metal or textile reinforcing elements and arranged radially on the outside of the working reinforcement. The working layers govern the mechanical behaviour of the crown. The reinforcing elements of the working layers are usually cords made up of spun textile filaments, preferably made of aliphatic polyamides or of aromatic polyamides. The protective layers essentially protect the working layers from attack likely to spread through the tread radially towards the inside of the tire. The reinforcing elements of the protective layers may be either cords made up of metal threads or cords made up of spun textile filaments.

According to embodiments of the invention, each cavity has, in the tread surface, an opening surface inscribed inside a circle. A cavity is a hole made in the tread opening onto the tread surface according to an opening surface. The opening surface may have any shape such as, by way of non-exhaustive examples, the shape of a circle, an ellipse, a square, a rectangle, a cross shape or a chevron shape. This opening surface may be inscribed inside a circle the diameter of which corresponds to the maximum dimension of the opening surface. A cavity is a hole extending radially towards the inside over a significant radial height at least equal to half the radial distance between the tread surface and the bottom surface.

Also according to embodiments of the invention, the centres of the circles, circumscribed at the opening surfaces of the cavities, are distributed axially, over at least part of the axial width of the tread surface, with an axial spacing at least equal to 0.02 times and at most equal to 0.12 times the circumferential length of the periphery of the tire.

The axial width of the tread surface is defined, by convention, as being the axial width of the contact patch of the tread surface of a new tire subjected to a combination of vertical load and inflation pressure leading to a radial deflection of 32%. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure.

The axial spacing is the axial distance between the centres of the circles circumscribed at the opening surfaces of two consecutive cavities. The axial spacing may be constant or variable.

The circumferential length of the periphery of the tire is the developed length of the tread surface. In practice it can be measured on the tire in the new condition, not mounted on a rim and uninflated, using, for example, a tape measure.

Still according to the invention, the centres of the circles, circumscribed at the opening surfaces of the cavities, are distributed circumferentially, over at least part of the periphery of the tire, with a circumferential spacing at least equal to 0.02 times and at most equal to 0.12 times the circumferential length of the periphery of the tire.

The circumferential spacing is the circumferential distance between the centres of the circles circumscribed at the opening surfaces of two consecutive cavities. The circumferential spacing may be constant or variable.

When an aeroplane tire, during the take-off or landing phase, runs over a blunt object, this object may cut the trend and start a crack over a certain radial thickness. As this crack enters the contact patch of the tread surface, under the action of cyclic mechanical stresses with each revolution of the wheel, this crack spreads radially towards the inside of the tire as far as the radially outermost crown layer, then spreads axially and circumferentially along the radially outer face of the radially outermost crown layer, causing the crown of the tire to be cut at the radially outermost crown layer. Under the effect of mechanical stresses and, in particular, centrifugal forces, the crack will spread radially towards the outside of the tire through the tread, at various azimuths of the tire. As a result, the portion of tread thus cut out in the form of pieces of varying dimensions, or even practically the entire tread, will detach from the tire and be thrown outwards with the risk of striking the structure of the aeroplane or of entering the engines.

In the case of a conventional tread, which means one comprising circumferential ribs separated by circumferential grooves, the pieces of tread may extend axially over an axial portion or over the entire axial width of the tread. Circumferentially, the pieces of tread may extend over a large proportion of the periphery of the tire, or even over the entire periphery thereof. As a result, the pieces of tread thrown out have penalizing dimensions and masses likely to damage the structures or engines of the aeroplane.

In the case of a tread according to embodiments of the invention, namely one which comprises axially and circumferentially distributed cavities, the pieces of tread have axial and circumferential dimensions that are smaller than in the case of a conventional tread.

This is because the cavities constitute regions that initiate the cutting of the tread, in so far as they correspond to a local reduction in the radial thickness of the tread. This reduction in thickness leads to a hinge effect as the cavities enter and leave the contact patch of the tread surface. It thus encourages the emergence of cracks spreading radially outwards from the radially outer face of the radially outermost crown layer. The mechanical stresses of alternately opening and closing the cavities, as they pass through the contact patch with each revolution of the wheel, encourage the cracks to spread and these cracks also open out more rapidly given the local reduction in radial thickness of the tread. In other words, the cavities constitute regions of local weakness encouraging the emergence of cracks and the initiation of the cutting of the tread.

The cavities, distributed axially and circumferentially with defined axial and circumferential spacings respectively, constitute a two-dimensional network of cavities defining planes of preferred cracking of the tread. This is because the cavities constitute the vertices of the cells of this two-dimensional network. The cracks emerging at the cavities will spread from one cavity to another causing the tread to be cut into the cells of this network. The inventors have been able to note that the maximum axial and circumferential dimensions of the pieces of tread resulting from the cutting of the tread were limited by the dimensions of the cells of the network.

The inventors have thus sought to optimize the axial distribution of the cavities along the axial width of the tread surface and the circumferential distribution of the cavities along the periphery of the tire in order to obtain pieces of tread the maximum dimensions of which meet the aeroplane manufacturer specifications. This optimization has led the inventors to choose an axial spacing and a circumferential spacing comprised between 0.02 times and at most equal to 0.12 times the circumferential length of the periphery of the tire. In particular, a maximum circumferential spacing equal to 0.12 times the circumferential length of the periphery of the tire guarantees that there will be at least one cavity in the circumferential direction present in the contact patch of the tread surface. The reference contact patch is that of a new tire subjected to a combination of vertical load and inflation pressure leading to a radial deflection of 32%.

The axial spacing of the centres of the circles, circumscribed at the opening surfaces of the cavities, is at least equal to 0.06 times the circumferential length of the periphery of the tire, so as to maximize the volume of tread to be worn away and so as not to limit excessively the maximum axial width of the pieces of tread liable to become separated.

The circumferential spacing of the centres of the circles, circumscribed at the opening surfaces of the cavities, is even more advantageously at least equal to 0.06 times the circumferential length of the periphery of the tire, so as to maximize the volume of tread to be worn away and so as not to limit excessively the maximum circumferential length of the pieces of tread liable to become separated. This spacing also makes it possible to have at least two cavities per row, in the circumferential direction, in the contact patch of the tread surface.

It is also advantageous for the centres of the circles, circumscribed at the opening surfaces of the cavities, to be distributed axially, over the entire axial width of the tread surface, with an axial spacing that is constant, so as to ensure the uniform presence of regions of weakness of the tread, and therefore the uniform opening-out of the cracks, in the axial direction.

Similarly, it is advantageous for the centres of the circles, circumscribed at the opening surfaces of the cavities, to be distributed circumferentially, over the entire periphery of the tire, with a circumferential spacing that is constant, so as to ensure the uniform presence of regions of weakness of the tread and therefore the uniform opening-out of the cracks, in the circumferential direction.

According to a preferred embodiment, the axial spacing and the circumferential spacing of the centres of the circles, circumscribed at the opening surfaces of the cavities, are equal. This feature ensures that the tread is divided into uniform mesh cells, encouraging more consistent tread piece dimensions.

The radius of a circle, circumscribed at the opening surface of a cavity, is advantageously at least equal to 1.5 mm. This is the minimum size of the opening surface and therefore of the cavity that allows the cutting of the tread to be initiated.

The radius of a circle, circumscribed at the opening surface of a cavity, is at most equal to 0.25 times the axial spacing and at most equal to 0.25 times the circumferential spacing, to guarantee that there is sufficient material between two cavities and avoid weakening the tread in normal operation, when it is not being damaged by a blunt object. This is because it is important to ensure that the tread remains intact during normal operation.

According to a preferred embodiment, the mean planes of the cavities are distributed between a first family of mean planes that are mutually parallel and make an angle with the circumferential direction, and a second family of mean planes that are mutually parallel and perpendicular to the mean planes of the first family. The mean plane of a cavity, defined in the context of the invention, is oriented perpendicular to the opening surface and along the longest dimension of the opening surface. The two-dimensional network of cavities thus obtained is therefore made up of rectangular or square cells well suited to even cutting of the tread.

According to a first alternative form of the preceding preferred embodiment, the angle of the first family of mean planes is equal to 0°. Under these conditions, the angle of the second family of mean planes is equal to 90°, with respect to the circumferential direction, and this is particularly favourable to cycles of opening and closing of the cavities the mean planes of which belong to this second family, as these cavities enter and leave the contact patch.

According to a second alternative form of the preceding preferred embodiment, the angle of the first family of mean planes is equal to 45°. Under these conditions, the angle of the second family of mean planes is also equal to 45°. As a result, this 45° angle will favour the cycles of opening and closing of the cavities of both families, as the cavities enter and leave the contact patch.

It is finally advantageous for the radial height of a cavity to be at least equal to half the radial height of the tread and at most equal to the radial height of the tread. The minimum radial height is justified by the fact that the cavity needs to be sufficiently effective. The maximum radial height is justified by the fact that the cavity must not extend beyond the maximum permitted tread wear. The optimizing of the radial height of the cavity is also dependent on the volume of tread required with regard to the intended tire wear performance. The cavities do not necessarily also have the same radial height so that they can, if appropriate, constitute a multi-level tread wear indicator.

BRIEF DESCRIPTION OF DRAWINGS

The features and other advantages of embodiments of the invention will be better understood with the aid of FIGS. 1 to 5.

In order to make the invention easier to understand, FIGS. 1 to 5 have not been drawn to scale and are simplified depictions.

DETAILED DESCRIPTION OF SPECIFIC EMBODIMENTS

Figure 1:
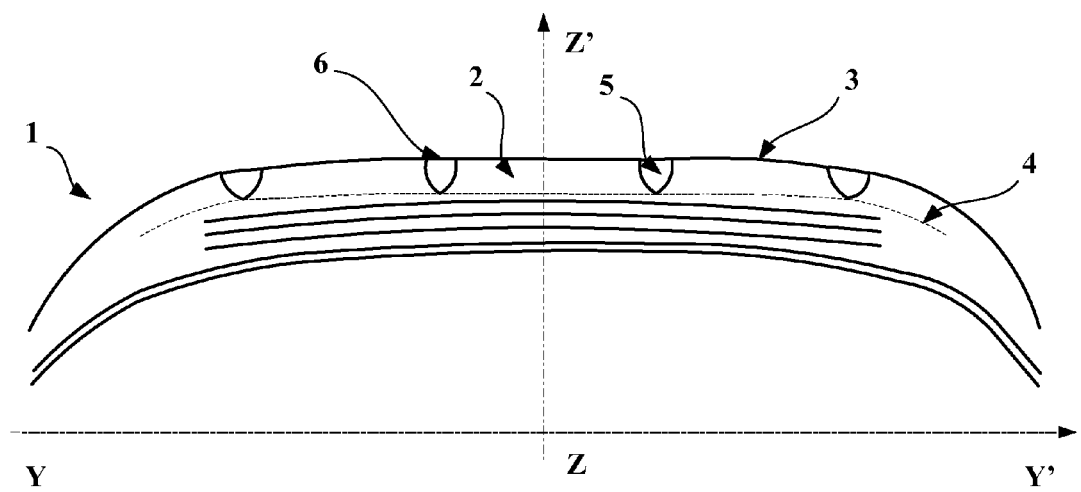
FIG. 1: meridian section through the crown of an aeroplane tire according to embodiments of the invention.

FIG. 1 shows a meridian section through the crown of the tire 1, namely a section in a meridian plane (YY', ZZ'), in which the directions YY' and ZZ' are the axial and radial directions respectively.

FIG. 1 shows a tire 1 for an aeroplane comprising a tread 2 intended to come into contact with the ground via a tread surface 3 and comprised radially between a bottom surface 4 and the tread surface 3. The tread 2 comprises cavities 5 which, in the tread surface 3, have opening surfaces 6. Radially on the inside of the tread is positioned a crown reinforcement which consists of a superposition of crown layers.

Figure 2:
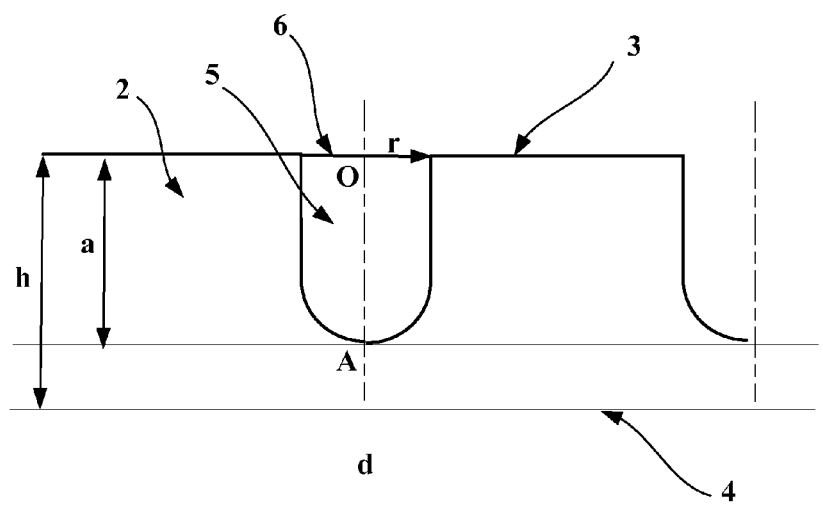
FIG. 2: view in cross section of a cavity on the mean plane of the cavity.

FIG. 2 depicts a view in cross section of a cavity 5 on the mean plane of the cavity, oriented perpendicular to the opening surface 6 of the cavity 5 and along the longest dimension of the opening surface 6. A cavity 5, formed in the tread 2, is comprised radially between the bottom surface 4 and the tread surface 3. The opening surface 6 is inscribed inside a circle 7 of centre O and of radius r, which has not been depicted because it is perpendicular to the plane of the figure. The radial height a of the cavity 5, measured along the straight line that passes through the radially innermost point A of the cavity 5 and is perpendicular to the tread surface 3, is at least equal to half the radial height h of the tread 2 between the bottom surface 4 and the tread surface 3, and at most equal to the radial height h.

Figure 3:
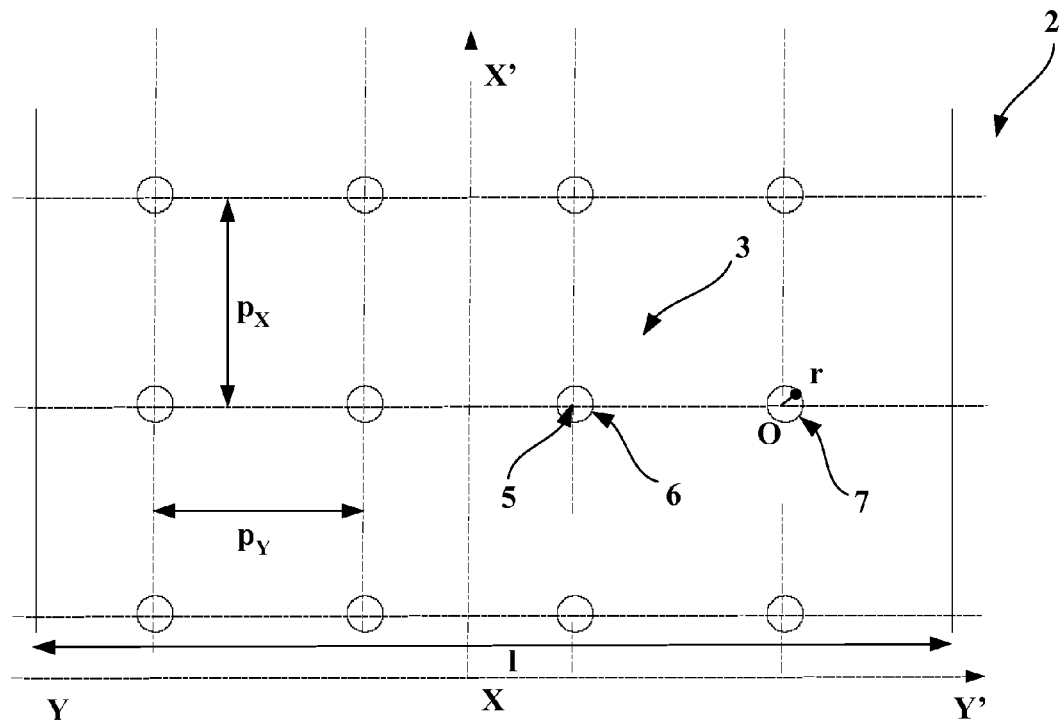
FIG. 3: plan view of a tread of an aeroplane tire according to a first embodiment of the invention.

FIG. 3 shows a plan view of a tread of an aeroplane tire according to a first embodiment of the invention. The tread 2 comprises cavities 5 opening onto the tread surface along a circular opening surface 6 of centre O and of radius r. In this particular instance the circle 7 circumscribed at the opening surface 6 is the circle that bounds the opening surface 6. The centres O of the circles 7, circumscribed at the opening surfaces 6 of the cavities 5, are distributed axially, over the entire axial width 1 of the tread surface 3, with an axial spacing $p_Y$ that is constant, guaranteeing that there are four cavities present in the axial direction YY'. The centres O of the circles 7, circumscribed at the opening surfaces 6 of the cavities 5, are distributed circumferentially, over the entire periphery of the tire, with a circumferential spacing $p_X$ that is constant and equal to the axial spacing $p_Y$. The circumferential spacing $p_X$ guarantees that there will be three cavities present in the contact patch in the axial direction XX'.

Figure 4:
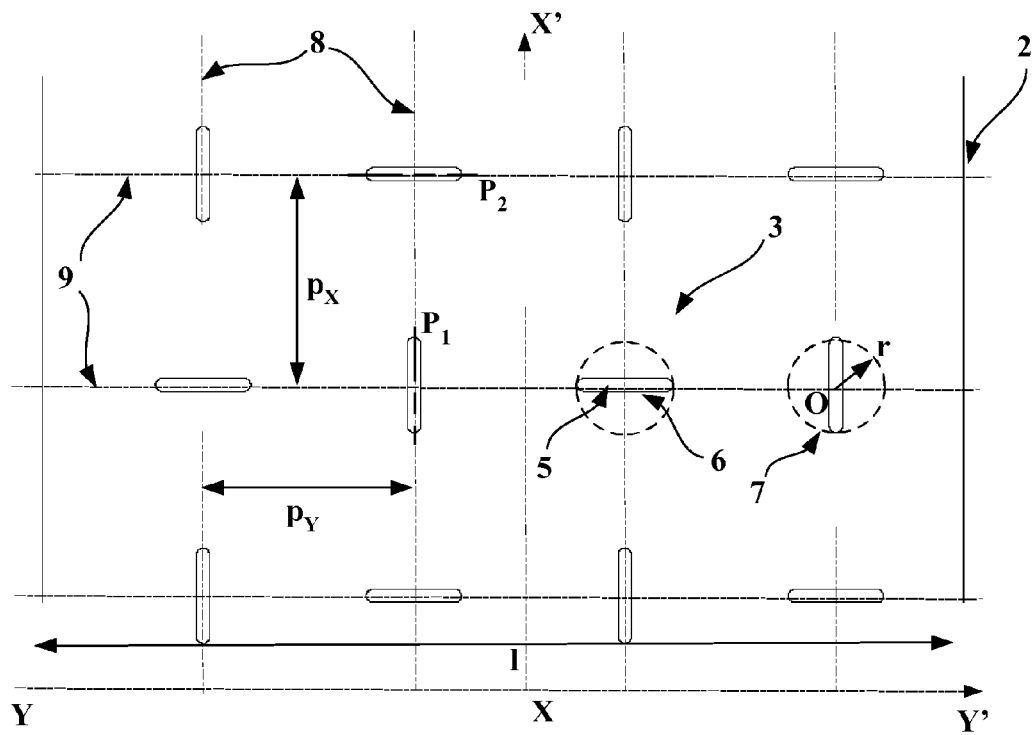
FIG. 4: plan view of a tread of an aeroplane tire according to a second embodiment of the invention.

FIG. 4 depicts a plan view of a tread of an aeroplane tire according to a second embodiment of the invention. This second embodiment of the invention differs from the first embodiment by the oblong shape of the opening surface 6 of the cavities 5. This oblong opening surface 6 is inscribed inside a circle of centre O and radius r. The mean plane ($P_1$, $P_2$) of each cavity (5) is oriented perpendicular to the oblong opening surface (6) and along the longest dimension of the opening surface (6), i.e. the major axis thereof. The mean planes ($P_1$, $P_2$) of the cavities (5) are distributed between a first family (8) of mean planes ($P_1$) that are mutually parallel and make a zero angle with the circumferential direction (XX'), and a second family (9) of mean planes ($P_2$) that are mutually parallel and perpendicular to the mean planes ($P_1$) of the first family (8), i.e. making an angle equal to 90° with the circumferential direction (XX').

Figure 5:
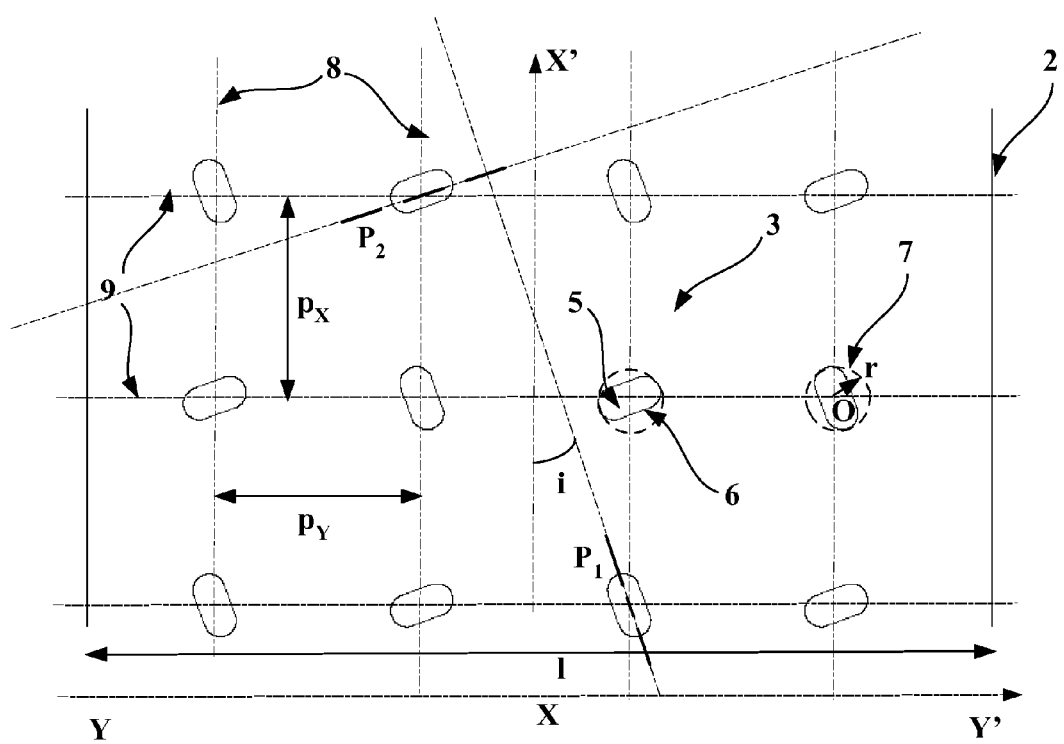
FIG. 5: plan view of a tread of an aeroplane tire according to a third embodiment of the invention.

FIG. 5 depicts a plan view of a tread of an aeroplane tire according to a third embodiment of the invention. This third embodiment of the invention differs from the second embodiment in terms of the angle formed by the mean planes ($P_1$) of the cavities (5) of the first family (8), with the circumferential direction (XX'). In this particular instance, the angle i is less than 45°.

The inventors have realized the invention according to the embodiment depicted in FIG. 4, with opening surfaces of cavities of oblong shape, for an aeroplane tire of size 46x17R20, use of which is characterized by a nominal pressure of 15.9 bar, a nominal static loading of 20473 daN and a maximum reference speed of 225 km/h.

In the tire studied, the crown reinforcement comprises seven working layers, comprising reinforcing elements made of hybrid material combining an aliphatic polyamide of the aramid type and an aromatic polyamide of the nylon type, the said reinforcing elements making a variable angle of between 0° and 12° with the circumferential direction. The crown reinforcement comprises radially, on the outside of the working layers, a protective layer comprising substantially circumferential metal reinforcing elements. The contact patch of the tread surface, when the new tire is subjected to a radial deflection of 32%, comprises, in the circumferential direction, four axial rows of three cavities, i.e. 24 cavities distributed with an axial spacing of 64 mm and a circumferential spacing of 64 mm. These cavities are distributed into a first family of cavities the mean planes of which are oriented in the circumferential direction, and a second family of cavities the mean planes of which are oriented in the axial direction. Each cavity has an opening surface of oblong shape inscribed inside a circle of radius 12 mm. Each cavity has a width of 4 mm, a radial height of 12 mm and a length of 24 mm.

In the case of the reference design, in which the tread comprises five conventional circumferential ribs, the mass of the pieces of tread is comprised between 0.1 kg and 3.5 kg, whereas in the design according to the invention, the mass of the pieces of tread is comprised between 0.1 kg and 0.8 kg.

In order to control the maximum dimensions of the pieces of tread even better, the invention may advantageously be combined with suitable crown designs.

For example, it is conceivable for the crown reinforcement, and particularly the radially outermost crown layer which is generally a metal protective layer, to be brought as close as possible to the bottom surface, for example at a radial distance of the order of 2 mm away. Alternatively, a tread separation layer, radially on the outside of the reference crown reinforcement, may be positioned as close as possible to the bottom surface. This makes it possible to achieve a corresponding reduction in the radial distance between the radially outermost crown layer and the bottom of the cavity, and therefore in the distance of cracking as the crack spreads radially outwards. In addition, the radial thickness of the pieces of tread is reduced and so too is their mass.

The tread separation layer may advantageously comprise mutually parallel reinforcing elements which are preferably, but not exclusively, made of aliphatic polyamide of the nylon type.

The angle made, with the circumferential direction, by the reinforcing elements of the tread separation layer or of the crown layer, which is positioned radially on the inside of and as close as possible to the bottom surface, may be optimized with respect to the angle of inclination of the mean planes of the cavities which has been described hereinabove.

The invention claimed is:

1. A tire for an aeroplane, comprising:
   a tread adapted to come into contact with the ground via a tread surface, and extending radially between a bottom surface and the tread surface,
   the tread comprising independent cavities,
   wherein each cavity has, in the tread surface, an opening surface inscribed inside a circle,
   wherein the centres (O) of the circles, circumscribed at the opening surfaces of the cavities, are distributed axially, over at least part of the axial width (l) of the tread surface, with an axial spacing ($p_Y$) at least equal to 0.02 times and at most equal to 0.12 times the circumferential length of a periphery of the tire, and
   wherein the centres (O) of the circles, circumscribed at the opening surfaces of the cavities, are distributed circumferentially, over at least part of the periphery of the tire, with a circumferential spacing ($p_X$) at least equal to 0.02 times and at most equal to 0.12 times the circumferential length of the periphery of the tire, and
   wherein the axial spacing ($p_Y$) of the centres (O) of the circles, circumscribed at the opening surfaces of the cavities, is at least equal to 0.06 times the circumferential length of the periphery of the tire.

2. The tire for an aeroplane according to claim 1, wherein the circumferential spacing ($p_X$) of the centres (O) of the circles, circumscribed at the opening surfaces of the cavities, is at least equal to 0.06 times the circumferential length of the periphery of the tire.

3. The tire for an aeroplane according to claim 1, wherein the centres (O) of the circles, circumscribed at the opening surfaces of the cavities, are distributed axially, over the entire axial width (l) of the tread surface, with an axial spacing ($p_Y$) that is constant.

4. The tire for an aeroplane according to claim 1, wherein the centres (O) of the circles, circumscribed at the opening surfaces of the cavities, are distributed circumferentially, over the entire periphery of the tire, with a circumferential spacing ($p_X$) that is constant.

5. The tire for an aeroplane according to claim 1, wherein the axial spacing ($p_Y$) and the circumferential spacing ($p_X$) of the centres (O) of the circles, circumscribed at the opening surfaces of the cavities, are equal.

6. The tire for an aeroplane according to claim 1, wherein the radius (r) of a circle, circumscribed at the opening surface of a cavity, is at least equal to 1.5 mm.

7. The tire for an aeroplane according to claim 1, wherein the radius (r) of a circle, circumscribed at the opening surface of a cavity, is at most equal to 0.25 times the axial spacing ($p_Y$) and at most equal to 0.25 times the circumferential spacing ($p_X$).

8. The tire for an aeroplane according to claim 1, wherein each cavity has a mean plane ($P_1$, $P_2$) oriented perpendicular to the opening surface and along a longest dimension of the opening surface, wherein the mean planes ($P_1$, $P_2$) of the cavities are distributed between a first family of mean planes ($P_1$) that are mutually parallel and make an angle (i) with the circumferential direction (XX'), and a second family of mean planes ($P_2$) that are mutually parallel and perpendicular to the mean planes ($P_1$) of the first family.

9. The tire for an aeroplane according to claim 8, wherein the angle (i) of the first family of mean planes ($P_1$) is equal to 0°.

10. The tire for an aeroplane according to claim 8, wherein the angle (i) of the first family of mean planes ($P_1$) is equal to 45°.

11. The tire for an aeroplane according to claim 1, wherein the radial height (a) of a cavity is at least equal to half the radial height (h) of the tread and at most equal to the radial height (h) of the tread.

* * * * *